Dec. 23, 1969   L. F. HECKELSBERG   3,485,891
CONVERSION OF PROPYLENE TO 5-DECENE
Filed May 18, 1967
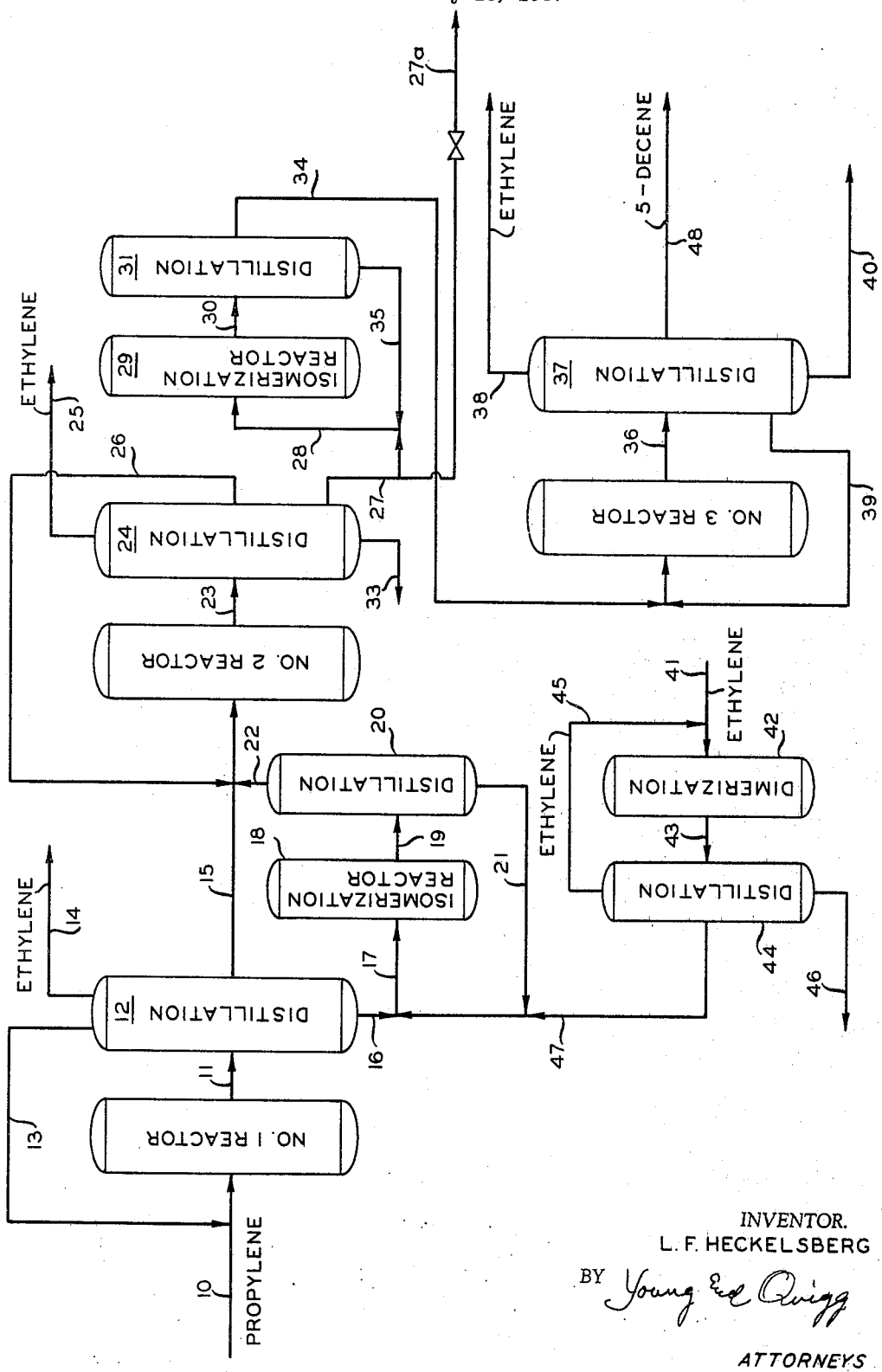
INVENTOR.
L. F. HECKELSBERG
BY *Young and Quigg*
ATTORNEYS United States Patent Office 3,485,891
Patented Dec. 23, 1969

3,485,891
CONVERSION OF PROPYLENE TO 5-DECENE
Louis F. Heckelsberg, Bartlesville, Okla., assignor to Phillips Petroleum Company, a corporation of Delaware
Filed May 18, 1967, Ser. No. 639,491
Int. Cl. C07c 3/62, 5/24
U.S. Cl. 260—683                      5 Claims

ABSTRACT OF THE DISCLOSURE

Propylene is disproportionated to ethylene and butenes. The butenes are isomerized to increase the 1-butene content and the 1-butene is disproportionated to produce ethylene and 3-hexene. The 3-hexene is isomerized to produce 1-hexene and the 1-hexene is disproportionated to produce ethylene and 5-decene. The ethylene is dimerized to produce additional butenes. The 3-hexene can be recovered as a by-product if desired.

---

In one aspect this invention relates to a method for converting propylene into 5-decene via the disproportionation reaction. In still another aspect this invention is directed to a combination of disproportionation steps and isomerization steps for converting propylene substantially completely into 5-decene.

Disproportionation is defined as the conversion of an acyclic mono-or polyene having at least 3 carbon atoms into other acyclic mono- or polyenes of both higher and lower number of carbon atoms.

Biodegradable detergents are made from linear olefins and 5-decene is a particularly desirable linear olefin for alkylating a phenol to make a nonionic, biodegradable detergent alkylate. Heretofore, the only source of 5-decene was mixtures of hydrocarbons containing 5-decene and it was recovered using tedious separation techniques such as extraction.

According to the present invention, 5-decene is made in good quantity by disproportionating propylene over a disproportionation catalyst to produce ethylene and butenes. The butenes are then isomerized to increase the 1-butene content and the 1-butene is disproportionated to produce 3-hexene and ethylene. The 3-hexene is then isomerized to produce 1-hexene which then disproportionated to produce ethylene and 5-decene. The ethylene from each disproportionation step is passed to a dimerization step where it is dimerized to butenes which are passed to the butene isomerization step to produce additional 1-butene.

The catalysts which are useful for the present invention are those which have activity for the disproportionation of propylene into ethylene and butenes. Some examples of such catalysts are:

(1) Silica or thoria promoted by an oxide or compound convertible to an oxide by calcination or sulfide of tungsten or molybdenum or by an oxide or compound convertible to an oxide by calcination of rhenium, vanadium, niobium, tellurium or tantalum;

(2) Alumina promoted with an oxide or compound convertible to an oxide by calcination of molybdenum, tungsten, or rhenium; a sulfide of tungsten or molybdenum; or an alkali metal salt, ammonium salt, alkaline earth metal salt, or bismuth salt of phosphomolybdic acid;

(3) One or more of the group zirconia, aluminum phosphate, zirconium phosphate, calcium phosphate, magnesium phosphate, or titanium phosphate promoted by one or more of a sulfide of molybdenum or tungsten, or an oxide or compound convertible to an oxide by calcination of molybdenum, tungsten, vanadium, niobium, tantalum or rhenium or magnesium tungstate or beryllium phosphotungstate; and (4) Silica, alumina, zirconia, aluminum phosphate, zirconium phosphate, calcium phosphate, magnesium phosphate, or titanium phosphate promoted by a hexacarbonyl or molybdenum or tungsten.

The catalysts of (1) can be prepared and activated by conventional techniques such as by combining a catalyst grade silica with suitable tungsten, molybdenum, rhenium, vanadium, niobium, tellurium, or tantalum compounds by a conventional method such as, for example, impregnation, dry mixing, or coprecipitation. Suitable tungsten and molybdenum compounds include tungsten oxide and molybdenum oxide and compounds convertible to these oxides. The supported oxides are activated by calcining in air and the supported sulfides are activated by heating in an inert atmosphere.

The catalysts of (2) can be prepared and activated by conventional techniques such as by combining catalyst grade alumina with an oxide or a compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture heated to prepare the catalyst.

The catalyst compositions of (3) can be prepared and activated by conventional techniques. For example, molybdenum oxide can be coprecipitated with aluminum phosphate followed by calcination in air to produce an activated catalyst. Alternatively, the support material, such as zirconia, can be impregnated with a compound of the promoter convertible to the oxide, such as ammonium tungstate, followed by calcination in air. In the preparation of a sulfide-containing catalyst, a sulfide of the promoter can be ball-milled with a support, such as zirconium phosphate, followed by heating in an inert atmosphere such as nitrogen. Magnesium tungstate and beryllium phosphotungstate can be dry mixed with titanium phosphate, for example, and activated by calcination in the air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalytic agent is considered to be the reaction product resulting from the admixture of the support material and the promoter material which admixture is subjected to activation treatment.

It is sometimes desirable, particularly with oxide-promoted olefin disproportionation catalyst, to improve the selectivity of the reaction by base treating the catalyst. This can conveniently be done by incorporating a minor amount of an inorganic base into the catalyst composite just prior to the activation heating step.

The operating temperature for the process of this invention when using catalysts of (1) is in the range of about 400 to 1100° F. The process of this invention when using the catalysts of (2) will be operated at a temperature in the range of about 150 to 500° F. The process using the catalysts of (3) will be carried out at a temperature of about 600 to 1200° F. The process using the catalysts of (4) will be carried out at a temperature of about 0 to 600° F. In the process of the invention, pressures are not important but will be in the range of about 0 to 2,000 p.s.i.g.

Other catalysts include those disclosed in Ser. No. 412,343 filed Nov. 19, 1964; now Patent No. 3,395,196; Ser. No. 517,918 filed Jan. 3, 1966; Ser. No. 517,905 filed Jan. 3, 1966; Ser. No. 421,692 filed Dec. 28, 1964; now Patent No. 3,418,390; Ser. No. 529,230 filed Feb. 23, 1966; Ser. No. 516,673 filed Dec. 27, 1965; and U.S. Patent 3,261,879 issued July 19, 1966.

The isomerization catalyst which can be used in the practice of this invention include magnesium oxide, silica-alumina, zeolitic silica-aluminas either alone or in combination with one of the transitional metals, and the like. Of the isomerization catalysts, magnesium oxide is preferred. Magnesium oxide, sometimes referred to as magnesia, applicable for use in this invention, can be any conventional catalytic grade or activated magnesium oxide prepared by any conventional technique. Thus, it can be prepared synthetically or derived from a naturally-occurring mineral, such as brucite. It can range in form from fine powder to coarse granules. The finished catalysts, after calcination, can also be in the form of powder or granules, as well as in other shapes such as agglomerates, pellets, spheres, extrudates, beads, and the like, depending upon the type of contacting technique which utilizes the catalyst. The magnesia should have a surface area of at least about one square meter per gram. Before use in the process the magnesium oxide is calcined, for example, by heating in a flowing stream of an oxygen-containing gas for about 1 to about 30 hours at 500–1500° F., preferably at about 600–1000° F.

In general, the contact of the feed olefin with the magnesium oxide is accomplished at temperatures ranging from about 150–1100° F., preferably about 300–1000° F., at a convenient pressure and any residence time or through-put rate which will effect the desired degree of conversion. Excellent results are often obtained with a weight hourly space velocity of about 10 to about 30. The reaction is essentially independent of pressure and pressures from atmospheric to about 500 p.s.i.g. are often utilized.

The dimerization catalysts which are applicable for use in the present invention include any conventional catalyst known to have activity for the dimerization of ethylene. The preferred catalysts are those which are capable of dimerizing ethylene with substantial selectivity. Some examples of applicable catalysts are supported nickel oxide catalysts such as those described in U.S. 3,045,054; 2,581,228; 2,606,940; 2,949,429; 2,881,233; 2,904,608; and 2,985,598; supported nickel sulfate catalysts such as those described in U.S. 2,749,842; supported palladium oxide catalysts such as those disclosed in U.S. 2,656,398; and supported phosphorus pentoxide catalysts such as those shown in U.S. 2,282,602. In addition to such solid catalysts, homogeneous catalyst systems can be used such as the catalyst comprising a mixture of ethylaluminum sesquichloride and triphenylphosphinenickelcarbonyl complex which is shown in U.S. 2,969,408.

The preferred dimerization catalysts are the supported nickel oxide catalysts. Such catalysts comprise such support materials as silica, alumina, silica-alumina, kieselguhr, activated clays and the like, and these are promoted with from about 0.1 to about 10 weight percent nickel oxide. In general, such catalysts are prepared by impregnating a suitable support material with an aqueous solution of a nickel salt which is convertible to the oxide on calcination, followed by heating the impregnated and dried composite to 800–1150° F. for 0.1–20 hours in a stream of flowing air.

It is an object of this invention to provide a method for producing 5-decene. Another object of this invention is to provide a method for converting propylene substantially completely to 5-decene. Still another object of this invention is to provide a method for producing substantially pure 3-hexene. Other objects, advantages and aspects of this invention will be apparent to one skilled in the art upon reading the disclosure including the detailed description of the invention and the appended drawing wherein:

The sole figure is a schematic diagram of a preferred embodiment of the invention.

Referring now to the drawing, propylene is passed via conduit 10 to reactor 1 and the effluent is passed via conduit 11 to distillation zone 12 which can be a single distillation zone or a series of distillation columns. Propylene is removed from distillation zone 12 via conduit 13 and returned to reactor 1 via conduit 10. Ethylene is removed via conduit 14 and passed to an ethylene dimerization zone referred to herinafter. Butene-1 is passed via conduit 15 to reactor 2 and butene-2 is passed via conduits 16 and 17 to isomerization reactor 18. The effluent from isomerization reactor 18 is passed via conduit 19 to distillation zone 20 from whence butene-2 is removed via conduit 21 and returned to the isomerization reactor and butene-1 is passed via conduit 22 to conduit 15 and thence to reactor 2. The effluent from reactor 2 is passed via conduit 23 to distillation zone 24 from whence ethylene is removed via conduit 25 and also passed to the dimerization step. Butene-1 is passed via conduit 26 to conduit 15 and thence to reactor 2. Hexene-3 is passed via conduit 27 and 28 to isomerization reactor 29. The effluent from isomerization reactor 29 is passed via conduit 30 to distillation zone 31. Heavy by-products are removed from distillation zone 24 via conduit 33. Hexene-1 is removed from distillation zone 31 via conduit 34 and hexene-2 and hexene-3 are removed via conduit 35 and returned to the isomerization reactor 29 via conduit 28. Hexene-1 is passed via conduit 34 to reactor 3 and the effluent from reactor 3 is passed via conduit 36 to distillation zone 37. Ethylene is removed overhead via conduit 38. Hexene-1 is removed via conduit 39 and returned to reactor 3 via conduits 39 and 34. Heavy by-products are removed from distillation zone 37 via conduit 40. Decene-5 is recovered as product via conduit 48.

The ethylene in conduit 38, along with ethylene in conduits 14 and 25, is passed via conduit 41 to ethylene dimerization reactor 42 from whence ethylene and butenes are removed via conduit 43 and passed to distillation zone 44. Ethylene is returned via conduit 45 to conduit 41; heavy by-products are removed via conduit 46; and butenes are passed via conduit 47 to conduit 21 and thence to isomerization reactor 18.

Reactor 1 contains a disproportionation catalyst such as about 8 weight percent tungsten oxide on silica; reactor 2 preferably contains a highly selective base-treated disproportionation catalyst such as tungsten oxide on silica treated with up to about 1 weight percent sodium; and reactor 3 contains a catalyst the same as or similar to that in reactor 2. The isomerization reactors contain an isomerization catalyst such as magnesium oxide. The dimerization reactor contains a dimerization catalyst such as nickel oxide on silica alumina.

Although the invention is directed primarily to the production of 5-decene, it should be noted that substantially pure hexene-3 is produced in distillation zone 31 and can be recovered if desired, at least in part, via conduit 27a. Ethylene can also be recovered as a by-product if desired.

The following specific embodiment will be helpful in attaining a more complete understanding of the invention; however, it should be understood that the specific embodiment is intended to be exemplary of the invention and not be considered as unduly limiting the invention.

Example

In a system as shown in the drawing, the first reactor contains a catalyst comprising about 8 weight percent tunsten oxide on silica and the reactor is operated at a temperature of 800° F., a pressure of 350 p.s.i.g., and a space rate of 40 parts of feed per part of catalyst per hour to provide a conversion of about 45 percent. The first isomerization reactor contains magnesium oxide catalyst; is operated at 800° F.; 350 p.s.i.g.; and is operated at a space rate of 20 parts by weight of feed per part by weight of catalyst per hour to provide a substantially equilibrium distribution of isomers. The second reactor contains a catalyst similar to the catalyst in reactor 1 except that it has been base treated and contains an additional 0.5 weight percent of sodium. The reactor is operated at 1000° F.; an atmospheric pressure and a space rate of 35 parts by weight of feed per part by weight of catalyst per hour to provide a conversion of about 22 percent. The second isomerization reactor contains magnesium oxide catalyst; is operated at 1000° F.; an atmospheric pressure and a space rate of 20 parts by weight of feed per part by weight of catalyst per hour to provide substantially equilibrium distribution of isomers. The third reactor contains a catalyst similar to that of the second reactor except that it contains only 0.25 weight percent sodium on the tungsten oxide on silica support. The reactor is operated at 950° F.; 10 p.s.i.g.,; and a space rate of 15 parts by weight of feed per part by weight of catalyst per hour to provide conversion of about 21 percent. The dimerization unit contains a catalyst comprising 4 weight percent nickel oxide on silica alumina and is operated at 100° F.; 300 p.s.i.g.; and a space rate sufficient to provide an effluent containing 56 percent butenes.

A material balance of the operation is shown in the following Table I wherein the quantities are in parts by weight and it should be noted that for 1000 parts by weight of propylene 555 parts by weight of 5-decene are produced.

The above example shows that propylene is effectively converted into 5-decene. The process also provides a source for 3-hexene and/or ethylene if such is desired.

That which is claimed is:

1. A process for producing decene-5 which comprises contacting propylene with a disproportionation catalyst under conditions suitable to produce ethylene and butene-2; contacting the butene-2 with an isomerization catalyst under conditions suitable to produce butene-1; contacting the butene-1 with a disproportionation catalyst under conditions suitable to produce ethylene and hexene-3; contacting the hexene-3 with an isomerization catalyst under conditions suitable to produce hexene-1; contacting the hexene-1 with a disproportionation catalyst under conditions suitable to produce ethylene and decene-5; and recovering the decene-5 as the product of the process.

2. The process of claim 1 wherein the ethylene is recovered from each disproportionation step and is passed into contact with a polymerization catalyst under conditions suitable to produce normal butenes; and the normal butenes are passed to the step of contacting butene-2 with an isomerization catalyst to produce butene-1.

3. The process of claim 1 wherein the ethylene is recovered as a product of the process.

4. The process of claim 1 wherein the hexene-3 is recovered as a product of the process.

5. The process of claim 1 wherein the effluent from each isomerization step is fractionated and the olefins other than the 1-olefins are recycled to the isomerization step from whence it came.

TABLE I.—STREAMS IN PARTS BY WEIGHT

| | 10 | 11 | 15 | 14 | 13 | 16 | 21 | 47 | 22 | 23 | 26 | 33 | 27 | 25 | 35 | 34 | 39 | 36 | 40 | 5-decene | 38 | 41 | 43 | 46 |
|---|---|---|---|---|---|---|---|---|---|---|---|---|---|---|---|---|---|---|---|---|---|---|---|---|
| Ethylene | | 333 | | 333 | | | | | | | 238 | | | 238 | | | | 111 | | | 111 | 682 | 20 | |
| Propylene | 1,000 | 1,220 | | | 1,220 | | | | | | | | | | | | | | | | | | | |
| Butene-1 | | 173 | 173 | | | | | | | 883 | 3,804 | 3,804 | | | | | | | | | | | | |
| Butene-2 | | 493 | | | | | 493 | 2,507 | | | | | | | | | | | | | | | | |
| Butenes | | | | | | | | | 390 | | | | | | | | | | | | | 390 | | |
| Hexene-1 | | | | | | | | | | | | | | | | | | 711 | 3,400 | 3,400 | | | | |
| Hexenes | | | | | | | | | | | | | | | | 5,750 | | | | | | | | |
| Hexene-3 | | | | | | | | | | | 710 | | | 710 | | | | | | | | | | |
| Decene-5 | | | | | | | | | | | | | | | | | | | | 555 | | 555 | | |
| By-products | | | | | | | | | | 108 | | 108 | | | | | | 45 | 45 | | | | 202 | 292 |
| Totals | 1,000 | 2,219 | 173 | 333 | 1,220 | 493 | 2,507 | 390 | 883 | 4,860 | 3,804 | 108 | 710 | 238 | 5,750 | 711 | 3,400 | 4,111 | 45 | 555 | 111 | 682 | 702 | 292 |

References Cited

UNITED STATES PATENTS 3,261,879  7/1966  Banks _____ 260—683
3,281,351  10/1966  Gilliland et al. _____ 260—683
3,409,540  11/1968  Gould et al. _____ 260—683

DELBERT E. GANTZ, Primary Examiner

C. E. SPRESSER, Assistant Examiner

U.S. Cl. X.R
260—683.2, 683.15